United States Patent [19]

Hwang

[11] Patent Number: 5,058,962
[45] Date of Patent: Oct. 22, 1991

[54] INTERMITTENT BOOSTING TYPE AUXILIARY MECHANISM FOR AUTO BRAKE SYSTEM

[76] Inventor: Chrang-Chuan Hwang, 2F, No. 108-1, Fu-Hsing Street, Baan-Chyau City, Taipei Hsien, Taiwan

[21] Appl. No.: 401,109

[22] Filed: Aug. 31, 1989

[51] Int. Cl.⁵ .............................................. B60T 8/28
[52] U.S. Cl. ................................ 303/116 PC; 303/61; 303/113 TB; 303/10
[58] Field of Search ..................... 303/10, 61, 68, 116, 303/143, 119, 11, 62, 63

[56] References Cited

U.S. PATENT DOCUMENTS

| | | |
|---|---|---|
| 3,524,684 | 8/1970 | Skoyles ................................. 303/61 |
| 4,109,970 | 8/1978 | Ashby, Jr. ......................... 303/61 X |
| 4,354,715 | 10/1982 | Farr et al. ............................ 303/116 |

FOREIGN PATENT DOCUMENTS

| | | | |
|---|---|---|---|
| 0265864 | 3/1989 | Fed. Rep. of Germany | ...... 303/116 |
| 3742824 | 7/1989 | Fed. Rep. of Germany | ...... 303/116 |

Primary Examiner—Matthew C. Graham
Attorney, Agent, or Firm—Leonard Bloom

[57] ABSTRACT

An auxiliary mechanism for an auto brake system, the mechanism includes a power cylinder, the interior of the power cylinder has a power piston and drive unit for pushing-up the power piston. A rectangular case body is joined to the rear end of the power cylinder and its interior has a rotational cam unit. An inductive unit including several on/off switches that are located on the power cylinder and a power box for driving said cam unit are provided. When oil pressure is transmitted into the power cylinder, the inductive unit will conduct the circuit and drive the cam unit to rotate for pushing-up the drive unit permitting the power piston to provide a boosting and pressure retaining function for each brake branch pump in order to achieve effective braking.

16 Claims, 5 Drawing Sheets

INTERMITTENT BOOSTING TYPE AUXILIARY MECHANISM FOR AUTO BRAKE SYSTEM

FIELD OF THE INVENTION

The present invention relates to an auxiliary mechanism for auto brake system.

BACKGROUND OF THE INVENTION

The present invention relates to a safe and economical auto brake system, and particularly to an auxiliary which can actually achieve an intermittent boosting brake effect by treading upon the brake pedal one time.

Generally speaking, to obtain a better braking effect, most drivers might tread upon the brake pedal violently or treading upon it several time during applying the brake so as to ensure braking. When the brake pedal is pressed, braking is provided through oil pressure of brake main pump and branch pump. However, most people are not in the habit of treading upon the brake with continuous and multiple actions. Moreover, under an emergency, one may not be able to make such response in time. In order to achieve multiple braking, a few automobiles have installed an improved ABS (Antilock Braking System) originally designed and used for the airplane. Said System is a computerized control for repeating braking operations several times if the braking force is insufficient. Nevertheless, providing said System is activated during high speed operation, its braking effect is not significant. Also, this System is very expensive and is liable to malfunction under frequent vibrations. Furthermore, said ABS not only is difficult to repair but also service is expensive. Obviously, an auto braking system needs a comparatively reasonable design for practical operating conditions.

SUMMARY OF THE INVENTION

One object of the present invention is to provide an intermittent boosting type auxiliary mechanism for auto braking system, which allows braking under a high speed operation.

Another object of the present invention is to provide an intermittent boosting type auxiliary mechanism for an auto braking system, which is safe and economical.

Still another object of the present invention is to provide an intermittent boosting type auxiliary mechanism for an auto braking system, which allows multiple boosting brake effects by means of treading upon the brake pedal only one time.

Techniques, elements and effects for the above and other objects, features and advantages of the present invention shall be better understood from the following descriptions when taken in conjunction with the accompanying drawings in which preferred embodiments of the present invention are shown by means of illustrative example. Nevertheless, special terms of equipment and accessories are only for explanation, not for limiting its meanings.

DESCRIPTION OF THE PREFERRED EMBODIMENT

Figure 1:
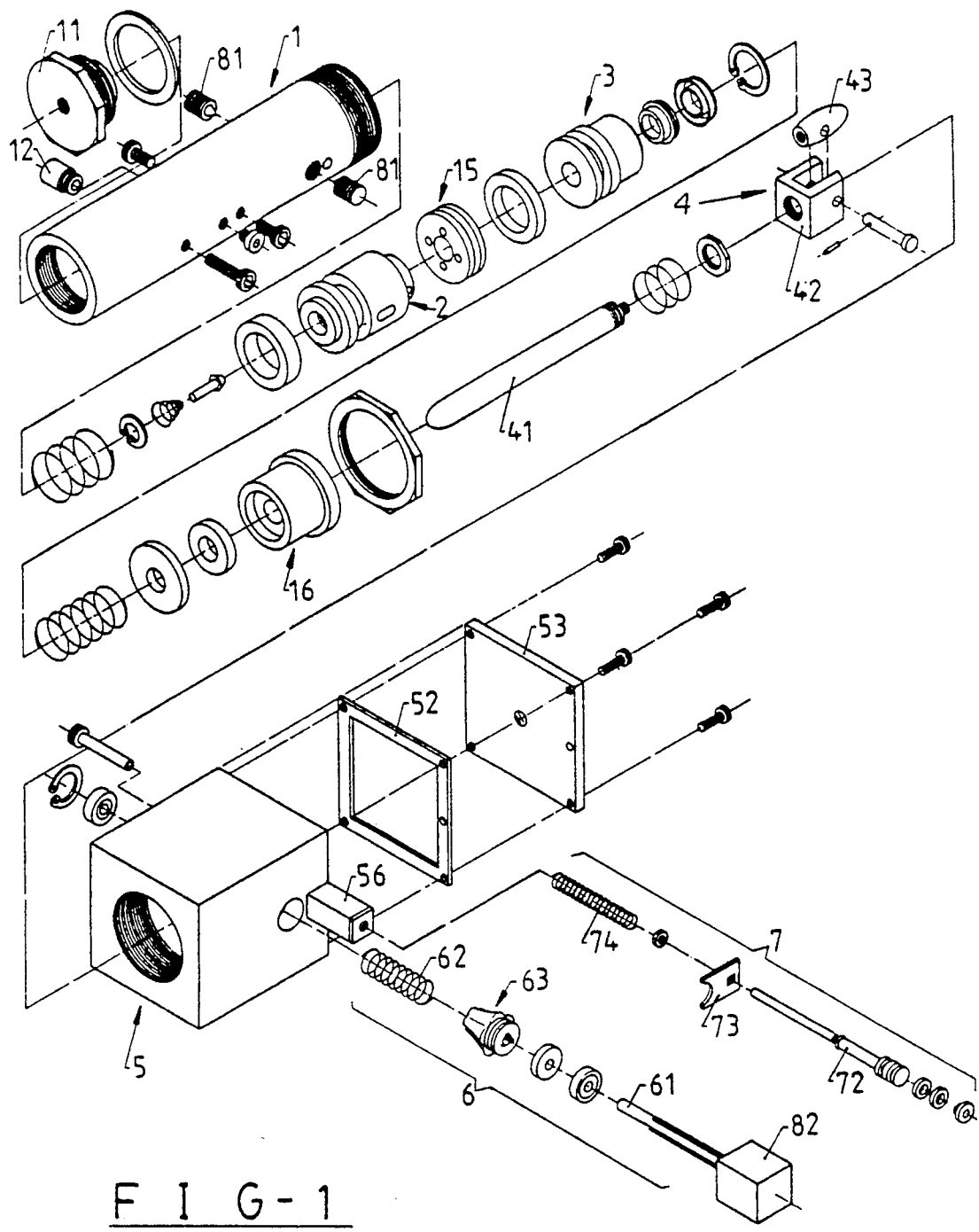
FIG. 1 is an exploded view of the present invention.
Figure 4:
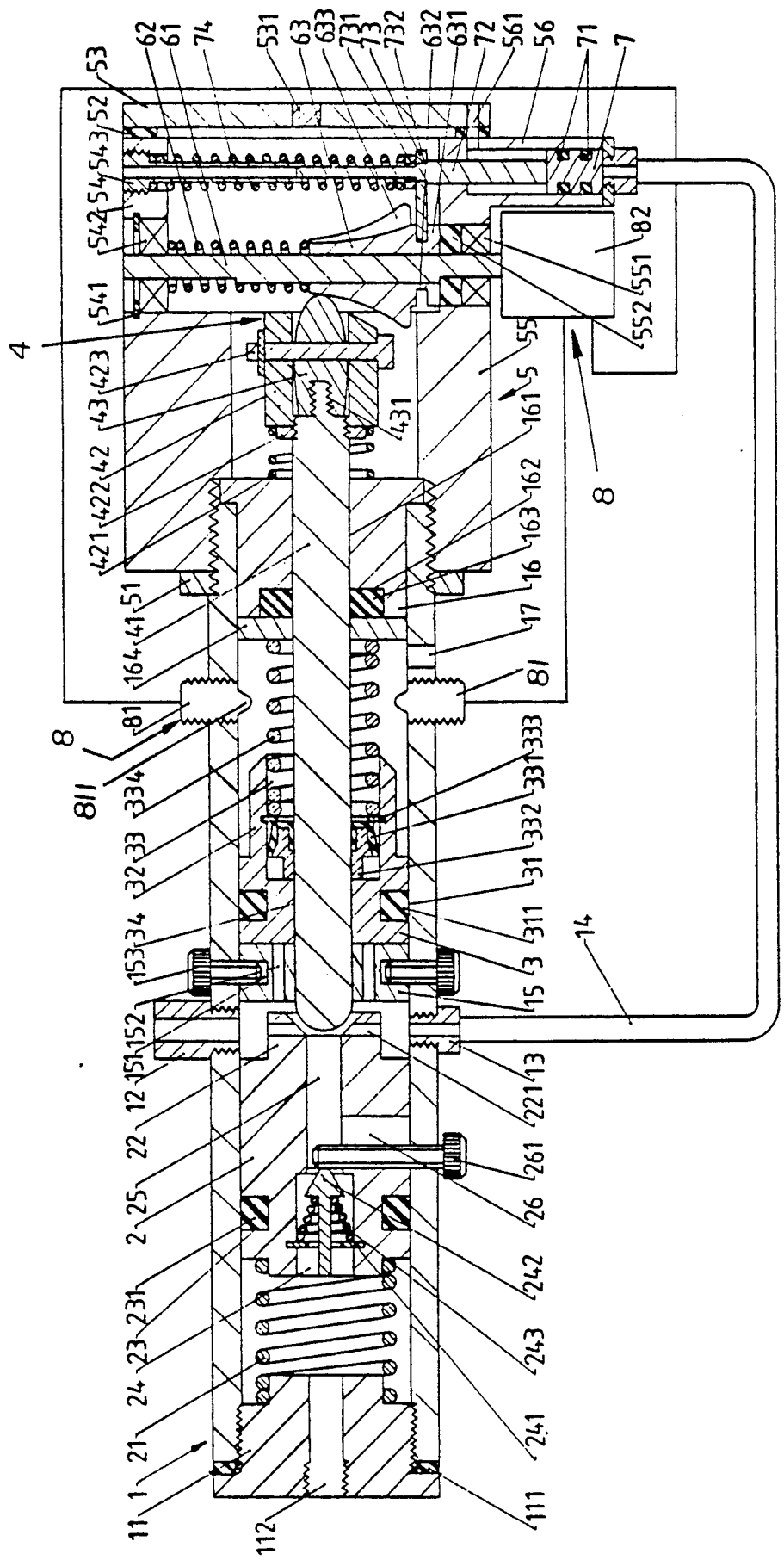
FIG. 4 is a transverse sectional view, showing the arrangement of various elements of the present invention.

Referring to various drawings shown, an intermittent boosting type auxiliary mechanism for auto braking system according to the present invention is comprised of a power cylinder 1, a power piston 2, an inductive piston 3, a drive unit 4, a case body 5, a cam unit 6, a thrust piston 7 and an inductive unit 8. The structures and functions relating to various main units according to the present invention will now be illustrated in details as below:

As shown in FIGS. 1 and 4, said power cylinder 1 approximately resembles a long cylindrical shape, its rear end is threaded externally, and its front end is equipped with a packing 111 being screwed on bolt 11. The inner part of said bolt 11 has a passage 112 for discharging brake oil into various branch pumps. An oil jet 12 is screwed into the frontal section of the wall of said power cylinder 1, connecting to an oil duct from the main pump. A by-pass oil intake 13 is located on the cylinder wall to transfer oil pressure to thrust piston 7 by means of connecting oil pipe 14. Several vent holes 17 are located near the end section of the wall of said power cylinder 1 to allow the air inside power cylinder 1 to ventilate.

The inner part of said power cylinder 1 has therein a frontal support seat 15 and a rear support seat 16 for supporting drive unit 4 of said unit. Said frontal support seat 15 resembles a ring plate shape and is located at the rear side of said oil jet 12. Its external part has a ring slot way 151 and its internal part has several axial through oil holes 152. By means of a screw 153 going through into said slot way 151 from the wall of said power cylinder 1, said frontal support seat 15 is thus positioned. Said rear support seat 16 resembles a laterally located T shape and is encased on the rear end of said power cylinder 1. Its central part has a shaft hole 161 and its front end has a concave part 162 for locating an oil seal ring 163. The front end of said rear support seat 16 is adhered to a packing piece 164.

Said power piston 2 is located within the front section of said power cylinder 1 and a spring 21 is located between its front end and said bolt 11 and its rear end is formed as a convex ring 22. Said convex ring 22 extends to the front side of said support seat 15 and its ring wall has a radial oil hole 221.

Said power piston 2 has a ring groove 23 externally. Said ring groove 23 has located a leather washer 231 inside to enable a seal to be maintained between said power piston 2 and the inner wall of said power cylinder 1. The frontal interior of said piston 2 has formed therein a vacant chamber 24. An oil hole (oil line) 25 is located between said vacant chamber 24 and rear end surface of said power piston 2 for transmitting oil therethrough. The rear section of said oil hole 25 resembles a horn shape. A C-ring 241, arrow-rod 242 and a horn-spring 243, of which both ends contact said C-ring 241 and said arrow-rod 242 respectively, are squeezed into said vacant chamber 24; in which, the head of said arrow-rod 243 resembles a conical shape and is packed toward the rear side of said oil hole 25 by means of urging by said spring 243.

A shifting hole 26 passes through the external radial way of said power piston 2 for inserting a long screw 261. Said long screw 261 is locked on the cylindrical wall of said power cylinder 1 passing through said shifting hole 26 and its terminal is located within said oil hole 25 intercepting the head of said arrow-rod 242. Under a normal condition (i.e. not treading upon the brake pedal), said long screw 261 intercepts and supports the head of said arrow-rod 242 to prevent it from blocking said oil hole 25. Said power piston 2 is pushed, moving toward the front end and said long screw 261 remains locked on the cylindrical wall of said power cylinder 1. However, said arrow-rod 242 follows the power piston 2 moving toward the front end to cause said long screw 261 and the head of said arrow-rod 424 to separate from each other. Said arrow-rod 242 has sealed the oil hole 25 upon being urged by said spring 243.

Said inductive piston 3 is located between said frontal support seat 15 and said rear support seat 16, and its exterior has a ring groove 31. The interior of said ring groove 31 has a leather washer 311. The rear section of said inductive piston 3 has formed therein a shorter diameter, an oblique and smaller rear end edge 32.

The central part of said inductive piston 3 has a shaft hole 34 and the interior of its rear section has formed therein a vacant chamber 33. The interior of said vacant chamber 33 has an oil seal ring 331 and an oil seal seat 332 to position both inside said vacant chamber 33 by means of a C-ring 333. A spring 334 is located inside said vacant chamber 33 and its both ends contact said C-ring 333 and packing piece 164 on the front end of said rear support seat 16 respectively. When oil pressure is transmitted from braking main pump 91 into said power cylinder 1, partial oil pressure through oil hole 152 of said frontal support seat 15 will push said inductive piston 3 to move backward and compress said spring 334. This causes the rear section of said inductive piston 3 to depress the inductive switch which is located on the cylindrical wall of said power cylinder 1 in order to start said inductive unit 8.

Said drive unit 4 is comprised of a drive shaft 41, a connection casing 42 and a pushed block 43. The front end of said drive shaft 41 resemble an ellipse which is respectively axial through said rear bearing block 16, said inductive piston 3 and said frontal bearing block 15 and extends to the back side of said power piston 2. Its rear section is threaded. Said connection casing 42 resembles a lateral U-shape and it is screwed to the rear end of said drive shaft 41. A spring 421 and a nut 422 are located between the front end of casing 42 and said rear support seat 16. Said pushed block 43 is located inside said connection casing 42 and is fixed into said connection casing 42 by means of inserting a pivot 423.

Said pushed block 43 resembles an ovoid and its front end has a tap hole 431 which is screwed to the rear end of said drive shaft 41. The rear end of said pushed block 43 protrudes over the open end of said connection casing 42 for being driven by said cam unit 6.

Said case body 5 resembles a hollow rectangle, which has a screw-on connection to the rear end of said power cylinder 1. Its front end has a nut 51, its rear end has a packing 52 and secured thereto is a cover plate 53; said cover plate 53 has a peep hole 531 for visual checking lubricating oil volume on said cam unit 4. One lateral wall 54 of said case body 5 has inlaid therein a C-ring 541 and a bearing 542, and, on another lateral wall 55, there is inlaid a bearing 551 and an oil seal ring 552 for pivot joining to said cam unit 6. Exterior of said case body 5 has a hollow jetty 56. The lateral wall of said jetty 56 allows disposition of said thrust piston 7.

Said cam unit 6 is pivoted within said case body 5 and has a cam shaft 61, a spring 62 and a multi-convex cam 63. One end of said cam shaft 61 is encased in said spring 62 and pivoted joining said bearing 542. Another end is encased in said cam 63 and pivoted joining said oil seal ring 552 and said bearing 551 as well as extending to the exterior of said case body 5.

Figure 2:
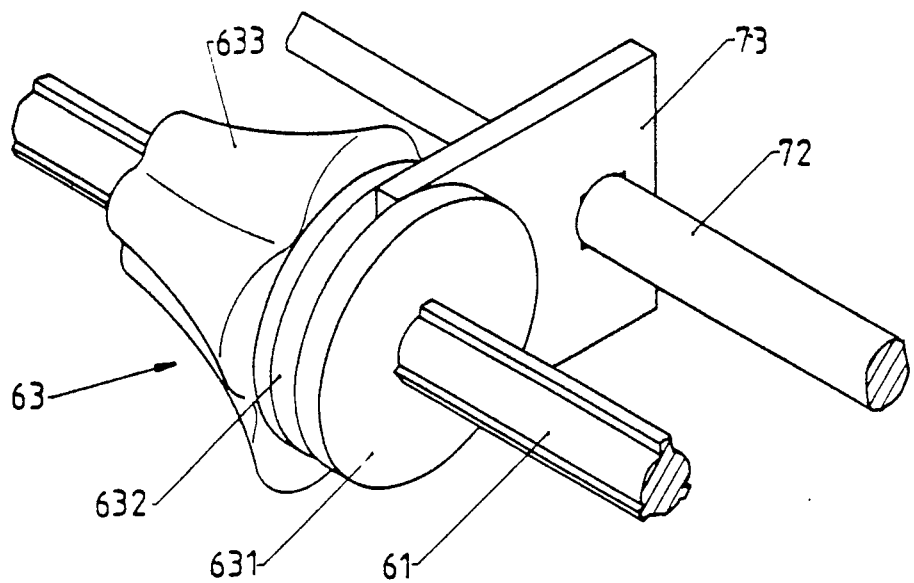
FIG. 2 is a perspective partial sectional view of cam unit and thrust piston showing said supporting plate holding said cam.
Figure 3:
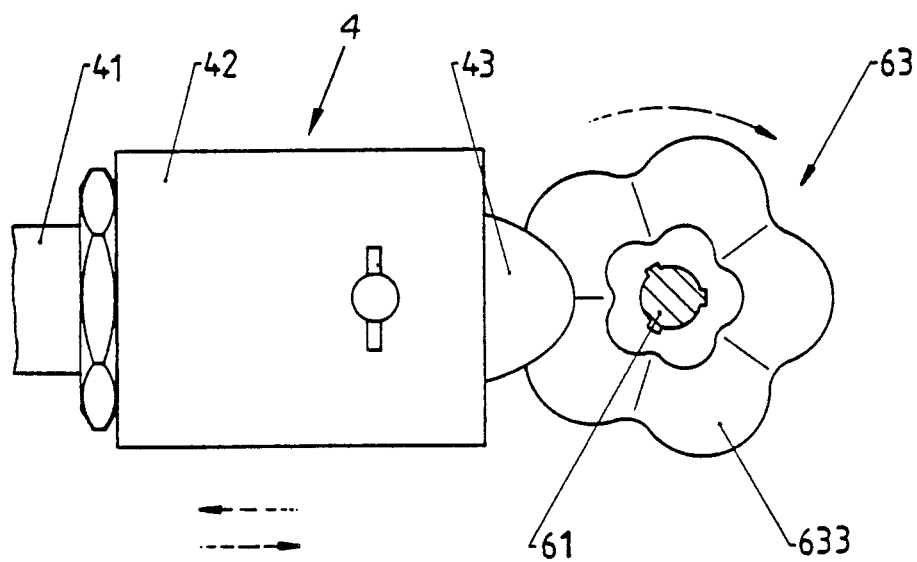
FIG. 3 is a diagrammatic view of the motion of said drive unit and said cam unit showing that said cam rotates to drive the pushed block for reciprocating motion.

As shown in FIGS. 2 and 3, said cam 63 resembling a conical body is keyed for locating on cam shaft 61 and allowing up and down movement, and its surface has formed thereon a multi-line circular convex surface 633. Each said convex surface 633 extends gradually externally along the radial from upper to the lower, which can rotate driving said pushed block 43 by means of the undulating surface of cam 63. Bottom section of said cam 63 is fabricated into a cylinder 631 with shorter diameter. The surface of said cylinder 631 has a ring groove 632 for casing a supporting plate 73 of said thrust piston 7.

Said thrust piston 7 is located within the jetty 56 of said case body 5 and it in motion by means of oil pressure transmitted from power cylinder 1. Its exterior has two leather washers 71 and its inner side has a ink 72 fixed thereto. The end of said link 72 extends into said case body 5 and is encased in a supporting plate 73 and a spring 74. The sectional face of said link 72 near its middle section appears as a square shape and the end section has formed thereon a smaller rod diameter.

One end of said spring 74 contacts said supporting plate 73 and another end is located within the lateral wall 54 of said case body 5. The lateral wall of said case body 5 is threaded to a sleeve 543 for inserting into said spring 74 to prevent spring 74 from distorting. Said supporting plate 73 resembles a U-shape, its plate face has a square hole 732 and its top is connected to said supporting plate 73 on said link 72 by means of a nut 731 to allow concave arc part of said supporting plate 73 to serve as a holding shape to be inlaid within groove 632 of said cam 63.

Figure 5:
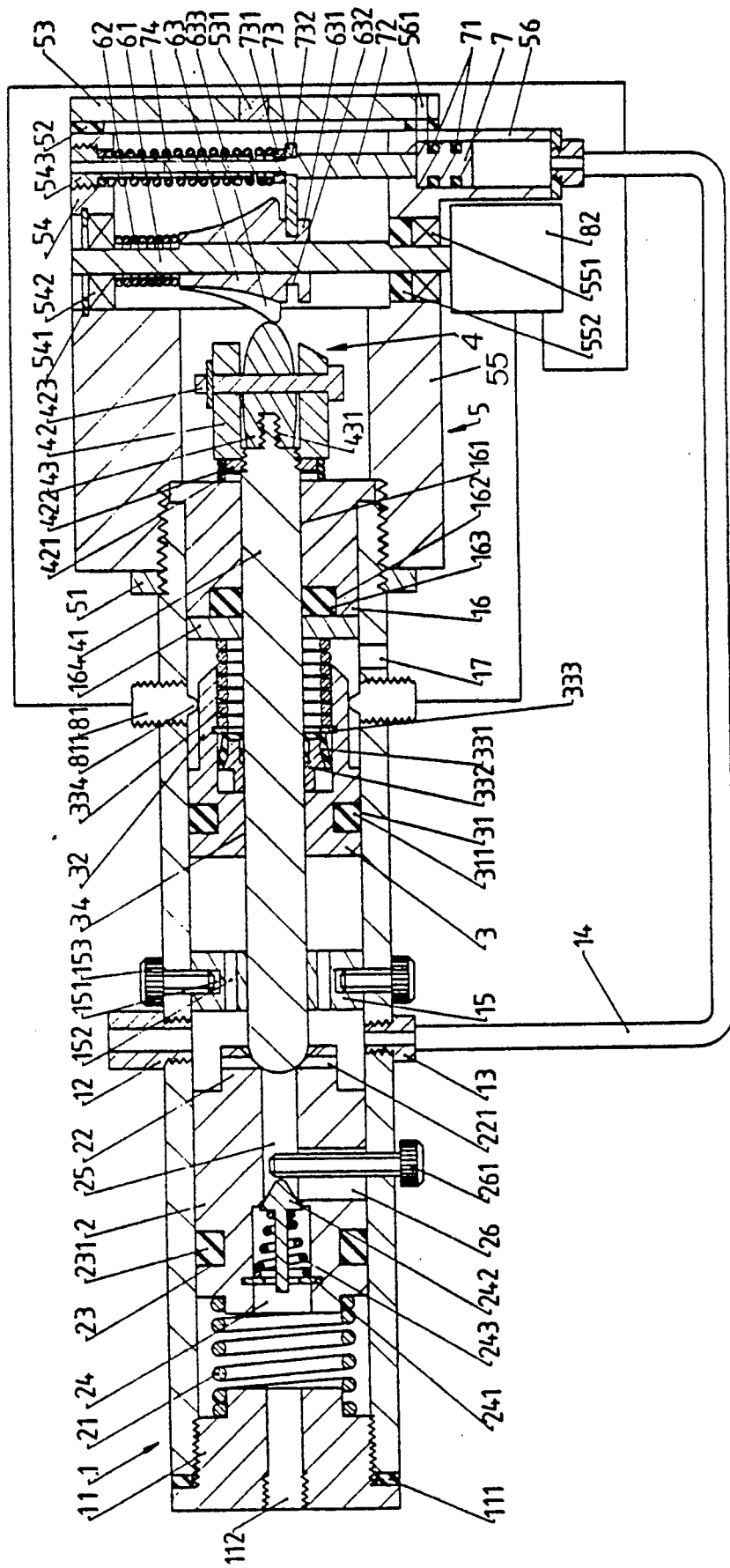
FIG. 5 corresponds to FIG. 4 showing the motion condition of the present invention.

As shown in FIG. 4, stroke of said thrust piston 7 is slightly smaller than the height of convex 633 of said cam 63. Upon piston 7 being pressed upwards, said supporting plate 73 is holding said cam 63 to move upwardly for driving said pushed block 43. When the oil pressure rises, said thrust piston 7 exhausts the air within said jetty 56 through vent hole 561 and moves up to the top point. As shown in FIG. 5, height of convex 633 of said cam 63 is little larger than the stroke of thrust piston. Therefore, said cam 63 will not lift too much and also can provide different driving forces by means of various convex 633.

Said on/off (inductive) unit 8 is comprised of inductive switch 81 and a power box 82. Each on/off (inductive) switch 81 is inlaid on the cylindrical wall of said power cylinder 1 and wired in parallel. When said inductive piston 3 is pushed toward the rear end by oil pressure, the rear section of said inductive piston 3 is pushing-up or driving and conducting or activating the circuit and emitting sounds to let the driver know said power box 82 is started normally. The interior of said power box has located therein a motor and gear set. The structure of said motor and said gear set is well known to those skilled in the art and is omitted herein. When each switch has closed the circuit, the motor within said power box 82 is started and drives said cam shaft 61 to rotate the gear set and engage said thrust piston 7 moving upwardly to let said cam 63 rotate and drive said pushed plate 43 in order to achieve a powerful braking action as well as to provide an intermittent boosting effect.

Under a regular condition when the driver does not tread hard upon the brake pedal so as to completely depress the brake pedal, oil pressure is transmitted from the main pump into said power cylinder 1 and distributed through each said oil hole 221, 152 and by-pass oil intake 13 for transmission to force said inductive piston 3 to move toward the rear end a small distance and not touch each said inductive switch 81. Meanwhile, said thrust piston 7 also is pressed to shift at a short stroke to force said drive shaft 41 shifting toward the front end a little but not driving said power piston 2. At this moment, braking motion is completed by means of partial oil pressure passing through said power piston 2 and transmitting to each branch pump and its effect is the same as the common braking motion.

Under an emergency condition, i.e., the automobile has to stop within a short distance, the driver is used to treading hard upon the brake pedal 90 so as to completely depress the brake pedal. As shown in FIG. 5, said inductive piston 3 has shifted toward the rear end by a larger displacement due to oil pressure rising, to depress each said inductive switch 81 and thus conduct or activate the motor circuit and drive said cam 63 to rotate. Meanwhile, said thrust piston 7 has proceeded in a larger compressive stroke due to pressure increasing significantly. When said link 72 moves accompanying piston 7, said cam 63 moves upwards by means of said supporting plate 73 to enable said cam 63 to rotate and push-up or drive said drive unit 4 with its convex 633. The present invention provides a boosting, pressure retaining cyclic effect to be convenient for high speed operation by means of the undulating surface of said cam 63 to enable said drive unit 4 to produce reciprocating motions, which is really able to produce a powerful brake force.

Figure 6:
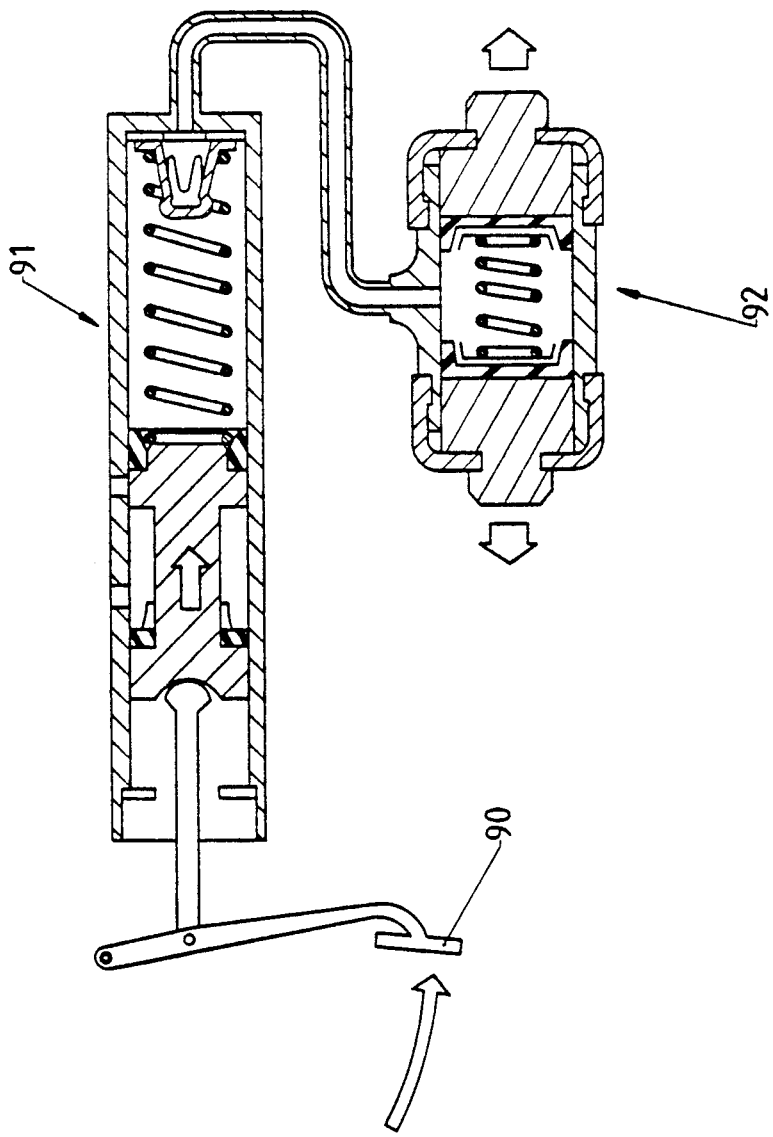
FIG. 6 is a diagrammatic view of a traditional hydraulic braking system.

When drive shaft 41 is pushed to shift toward the front end, its front end will push-up said power piston 2 and seal said oil hole 25. At this moment, said arrow-rod 242 has separated from said long screw 261 and sealed said oil hole 25 in order to actually block flow of brake oil on both ends of said power piston 2. At this moment, said power piston 2 is driven by drive shaft 41 and thus engages pressure upon brake oil on the front end of said power piston 2 as well as transmits oil pressure to each branch pump 92 to produce boosting function and therefore the automobile is allowed to brake within a short distance (FIG. 6).

When the automobile stops, the driver relaxes pressure on the brake pedal 90 and, owing to pressure drops, said inductive piston 3 is pushed back by said spring 334 to shift (reciprocate) toward the front end and inductive switch 81 will cut off the circuit to let said cam unit 6 stop. Meanwhile, said thrust piston 7 also has returned to the original position due to said spring 74 driving said supporting plate 73 and has permitted cam 63 to descend. Said drive unit 4 shifts toward the rear end, accompanying said cam 63 descending and separating from the rear end of said power piston 2 to enable said power piston 2 being driven by said spring 21 back to the original position whereupon its inner arrow-rod 242 is intercepted by said long screw 261 to keep said oil hole 25 open.

The present invention has both common braking function and auxiliary braking effect of intermittent boosting etc., i.e., if said inductive unit fails, the present invention still allows the traditional hydraulic braking motion without any effect. The present invention has excellent safety features and is very convenient for assembly and maintenance.

Obviously, many modifications maybe made without departing from the basic spirit of the present invention. Accordingly, it will be appreciated by those skilled in the art that within the scope of the appended claims, the invention may be practiced other than has been specifically described herein.

I claim:

1. An intermittent boosting type auxiliary mechanism for an auto brake system, comprising:
   a power cylinder formed resembling a long cylinder;
   a power piston located within said power cylinder, the interior of the power piston having a vacant chamber and an oil link formed therein for transmitting oil, whereby the power piston moves in a reciprocating manner within said power cylinder;
   an inductive piston located within said power cylinder for axial shifting in order to conduct a circuit;
   a drive unit located at the rear end of the power cylinder for pushing-up the power piston;
   a case body resembling a hollow rectangle and screwed joining the rear end of the power cylinder, the exterior of the case body being connected to an oil pipe through the power cylinder;
   a cam unit pivotally located within the case body with power supply from a power box for pushing up the drive unit;
   a thrust piston located within the case body for holding and pushing the cam unit; and
   an inductive unit having on/off switches therefor fixed to the cylindrical wall of the power cylinder and further having a power box shifting joint with the cam unit;
   the inductive piston provided for depressing each on/off switch to conduct the circuit and offering power supply to the power box in order to drive the cam unit and to permit the cam unit to rotate to push-up the drive unit, thereby producing a boosting, pressure retaining cyclic brake effect.

2. The intermittent boosting type auxiliary mechanism for the auto brake system of claim 1, wherein the exterior of the power cylinder has a frontal support seat and a rear support and its cylindrical wall having an oil intake, a bypass intake and several vent holes formed therein.

3. The intermittent boosting type auxiliary mechanism for the auto brake system of claim 2, wherein the frontal support seat resembles a ring plate shape located at the back side of the oil intake and the interior of which has several axial oil holes and its exterior has a ring slot way which is fixed by inserting a screw from the exterior of the power cylinder.

4. The intermittent boosting type auxiliary mechanism for the auto brake system of claim 2, wherein the rear support seat resembles a T shape being tightly cased into the rear end of the power cylinder, and wherein the front end has a concave part formed therein for locating an oil seal ring 5. The intermittent boosting type auxiliary mechanism for the auto brake system of claim 1, wherein the inner vacant chamber of the power piston includes a C-ring, an arrow-rod having a conical head and a horn-spring having a pair of ends that support the C-ring and the arrow-rod, respectively.

6. The intermittent boosting type auxiliary mechanism for the auto brake system of claim 5, wherein a radial shift hole is formed extending through the exterior of the power piston and a long screw is disposed extending therethrough, the long screw being locked on the cylindrical wall of the power cylinder with the terminal thereof extending into the shift hole being fitted for supporting the head of the arrow-rod.

7. The intermittent boosting type auxiliary mechanism for the auto brake system of claim 2, wherein the inductive piston is located between the frontal support seat and the rear support seat, and the back section thereof formed having a smaller external diameter and a smaller back end edge; the interior of the inductive piston having a vacant chamber formed therein for locating an oil seal seat, an oil seal ring, a C-ring and a spring.

8. The intermittent boosting type auxiliary mechanism for the auto brake system of claim 1, wherein the drive unit comprises a drive shaft and a casing; the front end of the casing formed resembling a lateral U-shape and the interior of the casing having a pushed block.

9. The intermittent boosting type auxiliary mechanism for the auto brake system of claim 8, wherein the pushed block is formed resembling ovoid having a tap hole formed in one end thereof and which protrudes over the open end of the casing at another end thereof.

10. The intermittent boosting type auxiliary mechanism for the auto brake system of claim 1, wherein the rear end of the case body includes a cover plate having a peep hole formed therein and including an exterior having a hollow jetty formed therein, a lateral wall of the jetty having vent holes formed therein.

11. The intermittent boosting type auxiliary mechanism for the auto brake system of claim 1, wherein, the cam unit includes a cam shaft, a spring and a camp the cam shaft including several long keys and one end of said cam shaft being enclosed in the spring and the other of the cam shaft being encased in the cam.

12. The intermittent boosting type auxiliary mechanism for the auto brake system of claim 11, wherein the cam formed resembling a conical body and its surface having a multi-line circular convex form, and each said convex gradually extending outward along the radial from the top to the bottom, the height of said convex from the top to the bottom being roughly larger than the maximum stroke of the thrust piston.

13. The intermittent boosting type auxiliary mechanism for the auto brake system of claim 11, wherein the bottom of the cam includes a cylinder having smaller diameter and the surface of the cylinder having a ring formed therein.

14. The intermittent boosting type auxiliary mechanism for the auto brake system of claim 1, wherein the inner side end of the thrust piston has a link fixed thereto and an end section of said link has a smaller diameter, and a spring and sectional face disposed near middle section of the thrust piston having a square shape for accommodating a support plate.

15. The intermittent boosting type auxiliary mechanism for the auto brake system of claim 14, wherein the support plate being in a U-shape having a concave arc part being inserted in a ring groove on the bottom of the cam to form a holding shape.

16. The intermittent boosting type auxiliary mechanism for the auto brake system of claim 14, wherein one end of the spring supports the support plate and another end extends into a sleeve being screwed on the lateral wall of the main body.

* * * * *